Oct. 3, 1939.  J. M. RANGE  2,174,836
SCREEN
Filed July 11, 1938   3 Sheets-Sheet 3
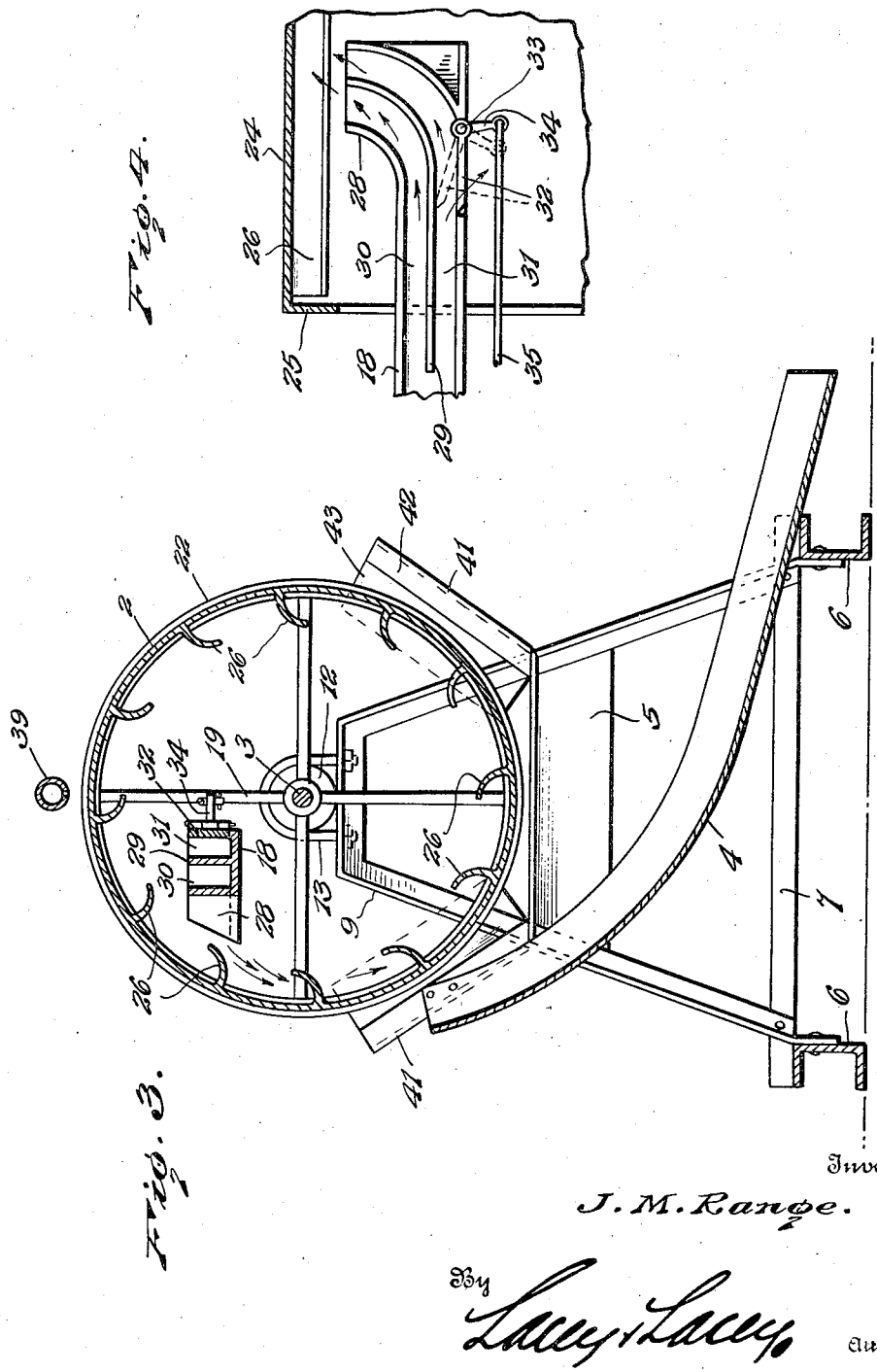

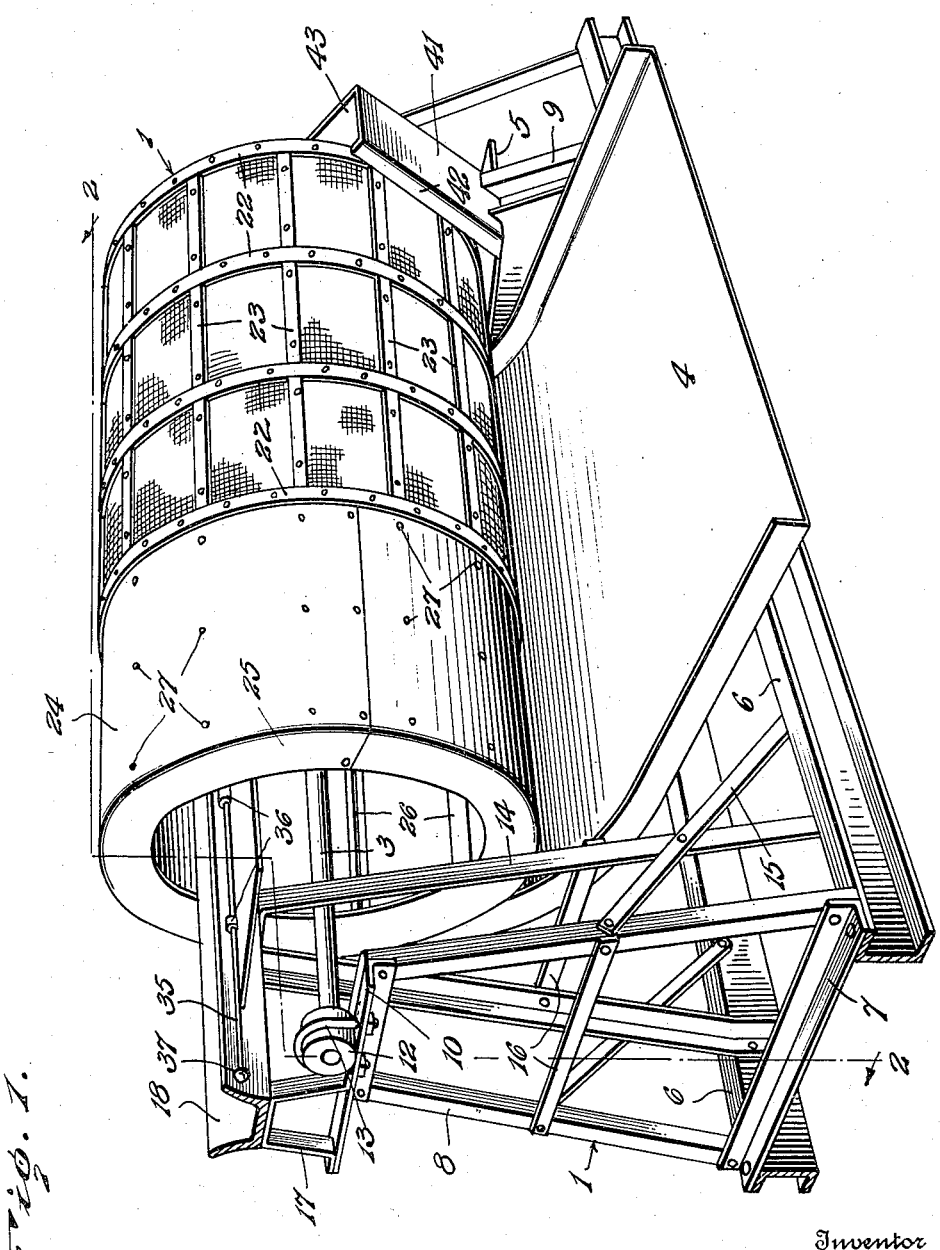

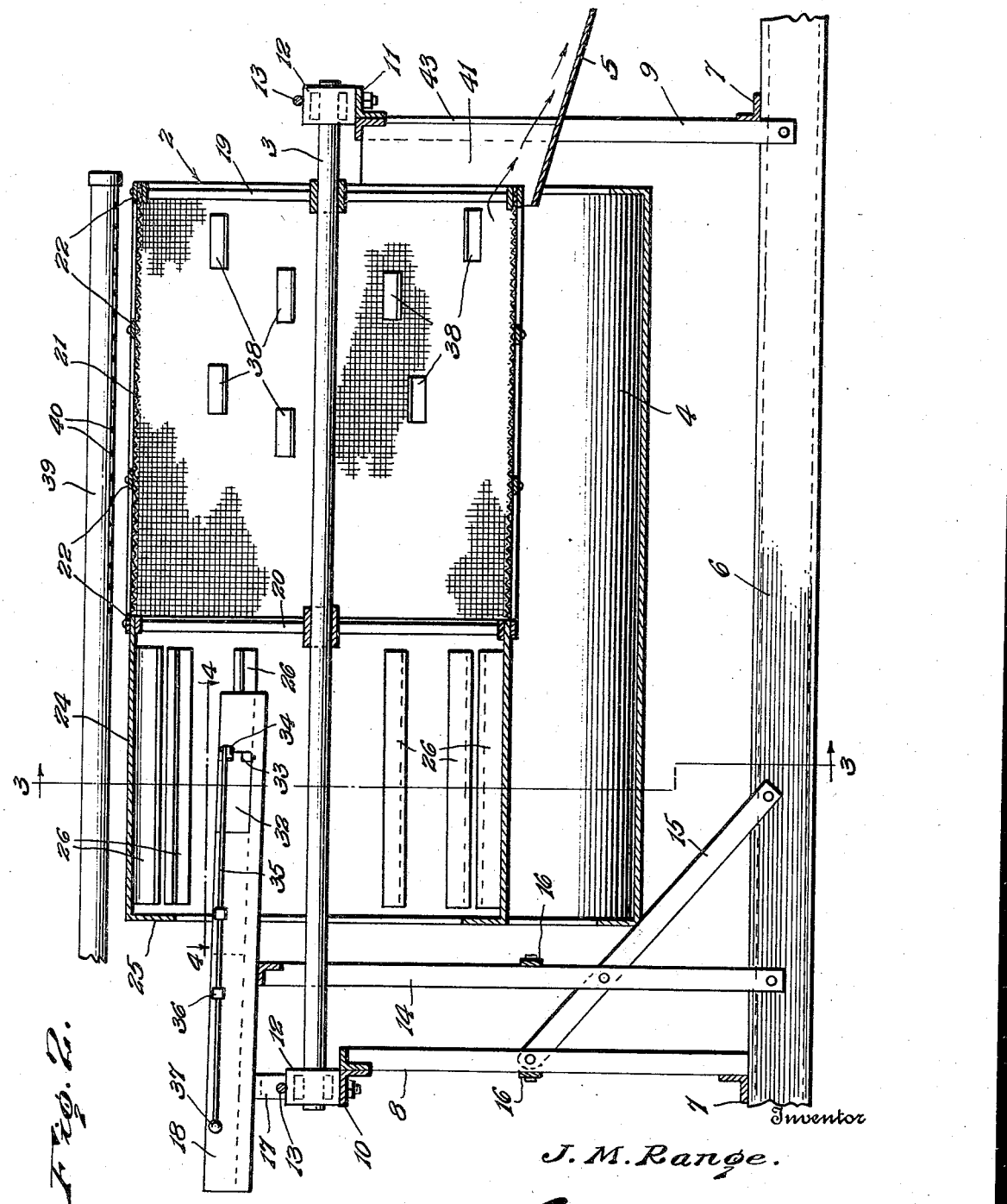

Patented Oct. 3, 1939

2,174,836

UNITED STATES PATENT OFFICE 2,174,836

SCREEN

John M. Range, Beeville, Tex.

Application July 11, 1938, Serial No. 218,657

5 Claims. (Cl. 209—270)

This invention relates to a screen of the rotary type, and it is one object of the invention to provide a rotary screen through which mud containing rocks and gravel may be passed in order to remove the rocks and gravel for discharge through an end of the screen while the mud passes through foraminous walls thereof onto a chute leading to a mud pit. It will thus be seen that the mud after being passed through the screen and delivered into the mud pit may be pumped out of the mud pit and as it will be free from stones and rocks and other similar matter the mud pump will not become choked.

Another object of the invention is to so form the screen that one end portion thereof carries buckets or pockets to receive the incoming mud and rock or gravel and may serve as means for imparting rotary motion to the screen. It will thus be seen that the screen will be rotated by the weight of the incoming material to be screened and need not have rotary motion imparted to it by a motor or the like.

Another object of the invention is to provide a rotary screen wherein the portion having foraminous walls carries internal blades which will serve to agitate stones and gravel passing through the same and thus cause the stones and gravel to move easily towards the discharge end of the screen while the mud passes through the foraminous walls.

Another object of the invention is to so form the body of the screen that the screening forming the foraminous walls will be very firmly held in place and prevented from being damaged during use of the screen.

Another object of the invention is to provide an improved chute for delivering the mud and stones into the inlet end of the screen, this chute being so formed that a portion of the incoming mud and stones may be diverted and dropped into the screen without being deposited in the buckets carried by the walls of the screen. It will thus be seen that the speed at which the screen will be turned may be controlled.

Another object of the invention is to provide an improved framework for rotatably mounting the screen and an improved type of chute for delivering the mud to the mud pit.

The invention is illustrated in the accompanying drawings, wherein:

Figure 1 is a perspective view of the improved screen,

Figure 2 is a sectional view taken longitudinally through the screen upon the line 2—2 of Figure 1, Figure 3 is a transverse sectional view taken along the line 3—3 of Figure 2, and Figure 4 is a fragmentary sectional view taken along the line 4—4 of Figure 2.

The improved screen consists briefly of a frame, indicated in general by the numeral 1, a cylindrical screen 2 extending longitudinally of the frame and rotatably mounted by its shaft 3, a mud pan 4 for receiving mud from the cylindrical screen and delivering the same into a mud pit, and a discharge spout or chute 5 along which stones, gravel and the like move when discharged from the cylindrical screen.

The frame 1 has a base formed of longitudinally extending side bars 6, and these side bars which are formed of strong metal beams are connected near their ends by cross bars 7 of angle metal. Standards 8 and 9 which are of A-shaped formation are disposed vertically adjacent ends of the side bars where they are firmly secured to the side bars and the cross bars, and at their upper ends these standards carry cross strips or shelves 10 and 11 upon which bearings 12 for the shaft 3 are secured by clamps 13. A standard 14 which is also of A-shaped formation is disposed vertically in spaced relation to the front end of the frame and the cylindrical screen, as shown in Figures 1 and 2, and upon referring to these figures, it will be seen that the standards 8 and 14 are securely held in an upright position by bracing strips 15 extending diagonally and secured to the side bars 6 and legs of the standards. Each standard is also provided with a transversely extending bracing strip 16 having its ends secured to legs of the standard. A yoke 17 is mounted upon the shelf 10 at one side of the bearing 12 carried thereby, and this yoke together with the standard 14 constitutes means for supporting a trough 18 through which mud containing stones, gravel and the like will be fed into the screen.

The cylindrical screen is built about spiders or wheels 19 and 20 which are firmly secured upon the shaft 3 in spaced relation to each other longitudinally thereof. For a portion of its length the screen has foraminous walls formed of screening 21, and in order to brace this screening, there have been provided circumferentially extending bands 22 and longitudinally extending strips 23, the bands and strips being formed of sheet metal and the screening being secured to them by rivets. For the remainder of its length the screen has sheet metal walls 24 terminating in an inturned front flange 25 extending about the circumference of the screen and serving to prevent mud and stones or gravel from spilling out of this end of the screen. Trough-shaped buckets 26 which extend longitudinally of the screen are secured to the sheet metal walls 24 by rivets 27, and upon referring to Figure 3, it will be seen that these buckets are so applied to the sheet metal walls 24 that mud and stones passing from the laterally extending discharge end of the trough 18 will be caught in these buckets and constitute weights to impart rotary motion to the screen. The trough is divided by a longitudinally extending partition 29 to form the two channels 30 and 31 through which the material moves, and referring to Figure 4, it will be seen that the wall of the trough which constitutes one wall of the channel 31 has a cut-out section 32 hingedly mounted, as shown at 33, in order that this movable section may be swung inwardly to the position indicated by dotted lines in Figure 4 and serve as a deflector for directing material out of the trough through the side opening formed when the section is swung inwardly. It will thus be seen that, while the material moving through the channel 30 may continue to be discharged into the buckets 26, the material moving through the channel 31 will be directed through its side opening and down into the bottom of the screen without being caught by the buckets. This will reduce the amount of material delivered into the buckets and consequent reduction of weight will serve to reduce the speed at which the screen turns. An actuating arm 34 extends from the pivoted end of the movable section or door 32, and to this arm is pivoted the inner end of a rod 35 which extends along the trough and is slidably mounted in bearings 36. By grasping the knob 37 at the outer end of the rod 35, this rod may be easily slid longitudinally through its bearings and the section or door 32 swung from the normal position, shown in full lines in Figure 4 to the deflecting position indicated by dotted lines.

When this screen is in use, mud discharged from the upper end of a well which is being drilled is received in the trough 18 and this mud, together with stones and the like contained therein, will flow along the trough and either all discharged from the trough into the buckets to rotate the screen or a portion deflected and caused to move through the side opening of the trough so that the speed at which the screen turns will be reduced. The mud and stones pass from the forward end portion of the screen having the sheet metal walls 24 to the portion of the screen having the foraminous walls of the screen and as it moves along this portion of the screen the mud will pass through the screening, whereas the stones will be held in the screen and pass out through the open rear end thereof and onto the chute 5. A number of blades 38 which serve as agitators and have the form of short troughs are secured against the foraminous walls of the screen and as these blade pass through the stones in the lower portion of the rotating screen they will serve to agitate the stones and thus cause the mud to rapidly flow through the screening. Some of the stones will be carried upwardly by the bucket-shaped blades and drop back to the lower portion of the screen. At times it will be desirable to clean the foraminous walls and in order to do so, there has been provided a pipe 39 which extends longitudinally of the screen over the same and is formed with a plurality of perforations 40 through which streams of water will be discharged to wash the mud from the screening. The sheet 5 consists of a flat plate or board having upwardly diverging end extensions 41 formed with inner and outer side flanges 42 and 43 and constituting wings which prevent stones and gravel from being thrown from sides of the chute as it is delivered onto the chute from the revolving screen. The mud passing through the perforated walls of the screen drops upon the pan or trough 4 and flows downwardly along this pan and into the mud well from which it will be removed by a mud pump and forced through a hose or other conduit to a suitable place of disposal. The pan 4 is curved longitudinally, as shown in Figure 3, and firmly secured at its upper end to provide a sloping surface down which the mud will easily flow.

Having thus described the invention, what is claimed as new is:

1. In a rotary screen, a rotatably mounted cylinder having an inlet end portion formed with solid walls and for the remainder of its length being provided with foraminous walls, buckets within the inlet end portion of said cylinder carried by the solid walls thereof and moving from a material holding position to an inverted material dumping position during turning of the cylinder, a trough extending into the inlet end portion thereof with its inner end terminating in position for delivering material into said buckets and providing weight for starting rotary motion to said cylinder, a partition extending longitudinally in said trough and dividing the same into a plurality of channels, said trough having a side wall section mounted for movement from a normal position to a position in which it extends across a channel and constitutes a deflector for directing material through a side outlet for the channel and into the cylinder, and means for adjusting the position of the cut-out portion of the trough.

2. In a screen, a rotatable cylinder open at its end and having its inlet end portion formed with solid walls, buckets within the inlet end portion of the cylinder carried by the walls thereof, a trough extending into the cylinder through the inlet end thereof with its inner end directed towards walls of the cylinder for delivering material into the buckets and providing weight for imparting rotary motion to the cylinder, said trough being divided longitudinally to provide a plurality of channels and at one side having a side opening, a door extending longitudinally in said opening and pivotally mounted at one end for movement into and out of position to extend across the adjacent channel and serve as a deflector for directing material through the side opening, an arm extending from the pivoted end of said door, and an actuating rod extending longitudinally of the trough and slidably mounted, said rod having its inner end pivoted to said arm and when shifted longitudinally being adapted to impart swinging movement to the door.

3. In a device of the class described, a rotatably mounted cylinder having an inlet portion, buckets within the inlet portion, a trough extending into the inlet portion and having a laterally extending inner end terminating in a position for delivering material into the buckets whereby rotary motion will be imparted to the cylinder, and means carried by the trough for diverting material to flow into the cylinder and away from the buckets.

4. In a rotary screen, a rotatably mounted cylinder having an inlet end portion, buckets within the inlet end portion, a trough extending into the inlet end portion and having a laterally directed end portion terminating in a position for delivering material into the buckets whereby said material will effect rotation of the cylinder, a partition extending longitudinally of the trough and defining channels, and means movable in one of said channels for diverting a portion of material from the laterally directed end portion directly into the cylinder.

5. In a rotary screen as recited in claim 4, wherein said means comprises a portion of the wall of the trough.

JOHN M. RANGE.